(12) United States Patent
Balk

(10) Patent No.: US 8,100,254 B2
(45) Date of Patent: Jan. 24, 2012

(54) CONVEYOR FOR CONVEYING AND BUFFERING ARTICLES

(75) Inventor: Wouter Balk, Baambrugge (NL)

(73) Assignee: Specialty Conveyor B.V., Zwaag (NL)

( * ) Notice: Subject to any disclaimer, the term of this patent is extended or adjusted under 35 U.S.C. 154(b) by 364 days.

(21) Appl. No.: 12/444,272

(22) PCT Filed: Oct. 5, 2007

(86) PCT No.: PCT/NL2007/050485
§ 371 (c)(1),
(2), (4) Date: Apr. 3, 2009

(87) PCT Pub. No.: WO2008/044926
PCT Pub. Date: Apr. 17, 2008

(65) Prior Publication Data
US 2010/0025190 A1    Feb. 4, 2010

(30) Foreign Application Priority Data

Oct. 9, 2006  (NL) ...................................... 2000266

(51) Int. Cl.
*B65G 17/00* (2006.01)
*B65G 47/26* (2006.01)
(52) U.S. Cl. .................... 198/778; 198/468.8; 193/35 A
(58) Field of Classification Search .................. 198/778, 198/456, 460.1, 468.8; 193/35 A
See application file for complete search history.

(56) References Cited

U.S. PATENT DOCUMENTS

| | | | | |
|---|---|---|---|---|
| 790,776 | A | * | 5/1905 | Alvey .............................. 193/36 |
| 883,297 | A | * | 3/1908 | Courtney ..................... 193/35 S |

(Continued)

FOREIGN PATENT DOCUMENTS

WO        9911547        3/1999

(Continued)

OTHER PUBLICATIONS

Official Search Report of the European Patent Office in counterpart foreign application No. PCT/NL2007/050485 filed Oct. 5, 2007.

(Continued)

*Primary Examiner* — Douglas Hess
(74) *Attorney, Agent, or Firm* — Steven M. Koehler; Westman, Champlin & Kelly, P.A.

(57) ABSTRACT

A conveyor is provided for conveying and buffering articles (G) and the like along a vertically extending, substantially helical path. A conveying assembly such as a conveyor belt or conveyor rollers is supported by a frame and driven by a drive unit and extends along said helical path and conveys articles along said path. The substantially helical path is divided into zones (Z), each zone being provided with switch members, in such a manner that the conveyor can be switched in each zone between a conveying position, in which the conveying assembly conveys the articles, and a buffering position, in which the articles present in said zone are stationary. Buffering devices distributed over the length of the conveyor and being present in each zone support the articles in the buffering position. The drive unit and/or the conveyor belt/rollers on the one hand and the buffering devices on the other hand are vertically movable with respect to each other in each zone (Z), in such a manner that the articles (G) in question are in contact with the drive unit in the conveying position and with the buffering devices in the buffering position in said zone. In this way a simple and reliable buffering system can be realised.

20 Claims, 7 Drawing Sheets

U.S. PATENT DOCUMENTS

| | | | | |
|---|---|---|---|---|
| 1,890,753 | A * | 12/1932 | Scheurer | 221/75 |
| 3,101,829 | A * | 8/1963 | Silver | 193/12 |
| 3,532,201 | A * | 10/1970 | McConnell | 193/35 A |
| 3,771,633 | A * | 11/1973 | Bezrukov et al. | 193/35 A |
| 3,830,409 | A * | 8/1974 | Jenkinson | 221/236 |
| 4,361,225 | A | 11/1982 | Saur | |
| 5,070,987 | A * | 12/1991 | Koltookian | 198/368 |
| 5,133,449 | A * | 7/1992 | Spangler | 198/778 |
| 5,850,781 | A * | 12/1998 | Kuenen | 99/443 C |
| 6,199,677 | B1 * | 3/2001 | Belz et al. | 193/35 S |
| 6,298,971 | B2 * | 10/2001 | Belz et al. | 193/35 S |
| 6,336,551 | B1 | 1/2002 | Balk | |
| 6,398,014 | B2 * | 6/2002 | Belz et al. | 198/778 |
| 6,523,677 | B1 * | 2/2003 | DeGennaro et al. | 198/778 |
| 6,659,268 | B2 * | 12/2003 | Belz et al. | 198/778 |
| 6,935,485 | B2 * | 8/2005 | Belz et al. | 198/778 |
| 7,150,352 | B2 | 12/2006 | Cotter | |
| 7,428,962 | B2 * | 9/2008 | Shefet et al. | 198/778 |
| 7,823,718 | B2 * | 11/2010 | Spencer | 198/594 |
| 2003/0192769 | A1 | 10/2003 | Cotter | |

FOREIGN PATENT DOCUMENTS

| | | |
|---|---|---|
| WO | WO 02064463 A | 8/2002 |
| WO | 03024846 | 3/2003 |

OTHER PUBLICATIONS

Written Report of the European Patent Office in counterpart foreign application No. PCT/NL2007/050485 filed Oct. 5, 2007.

* cited by examiner

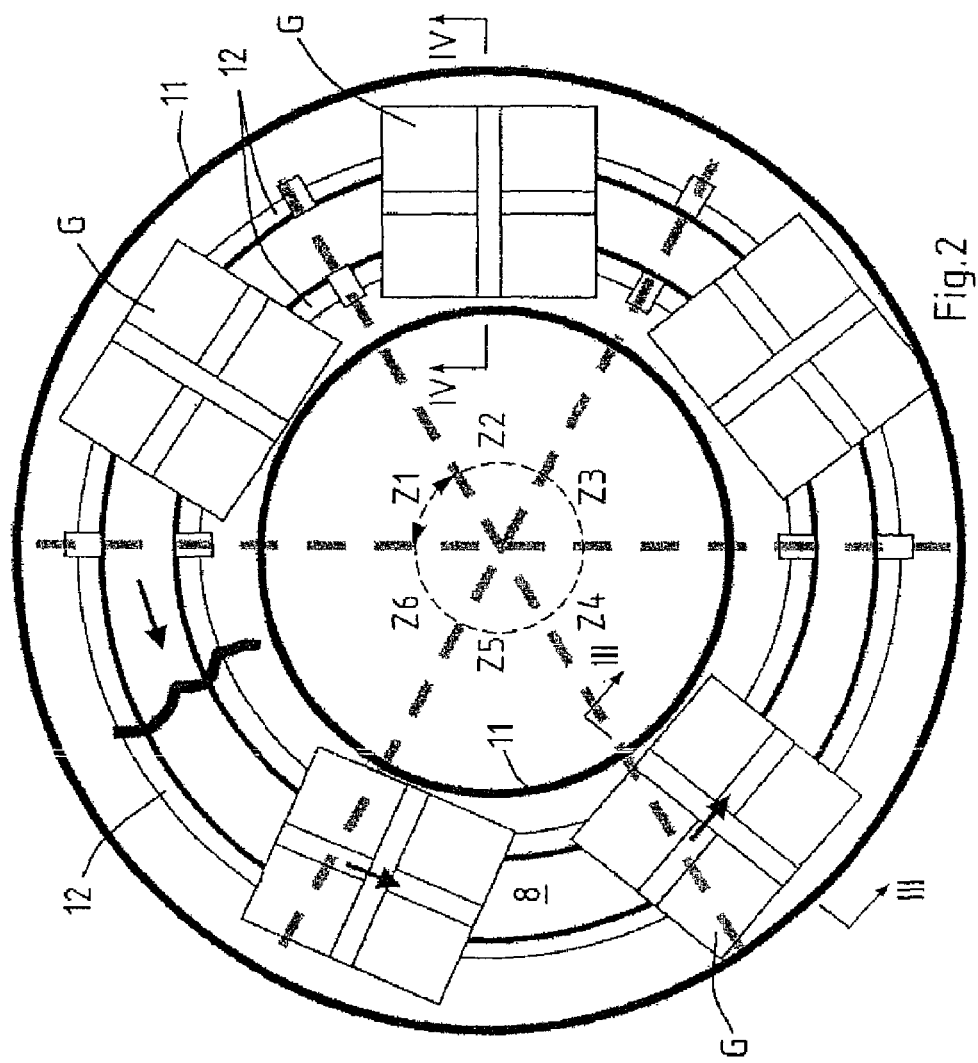
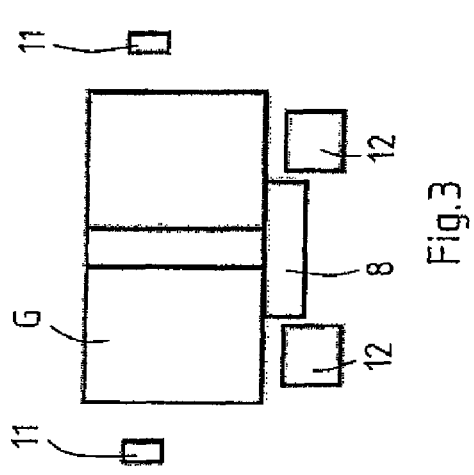
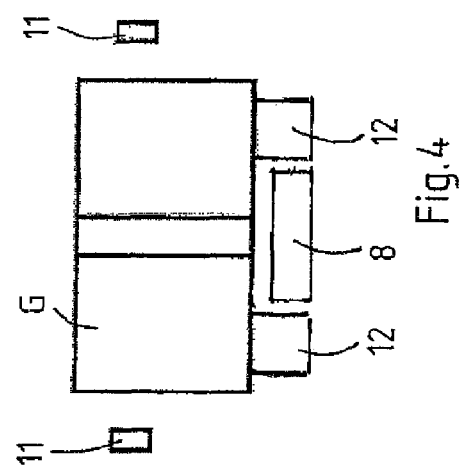

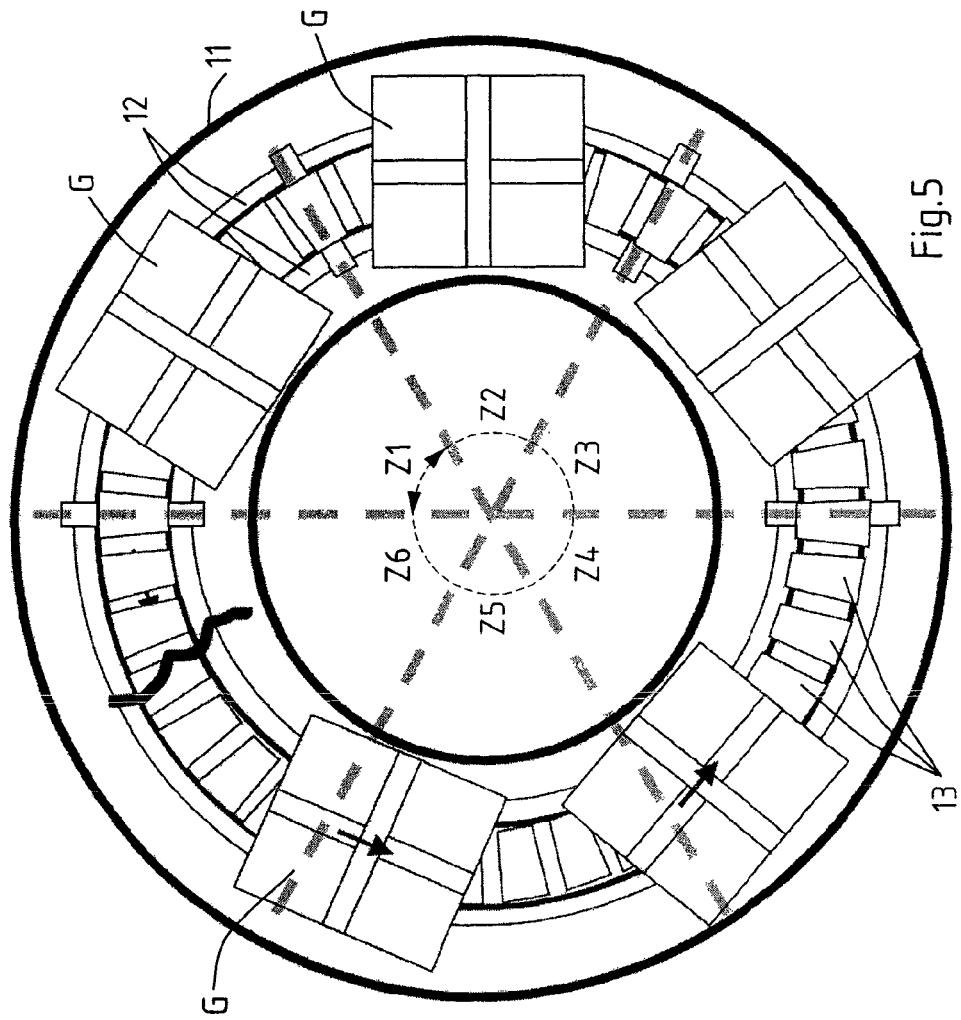
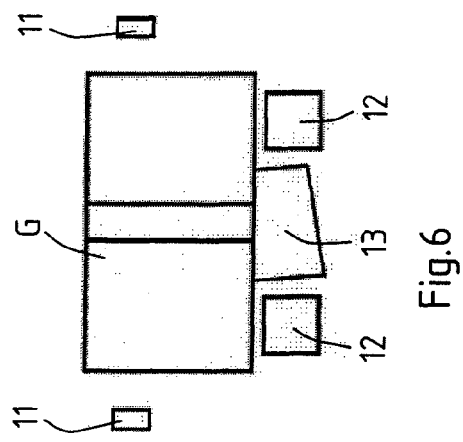
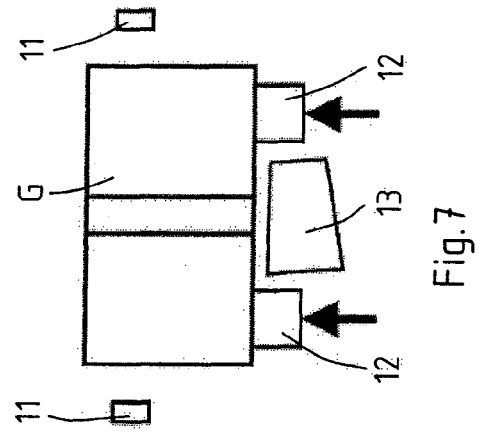

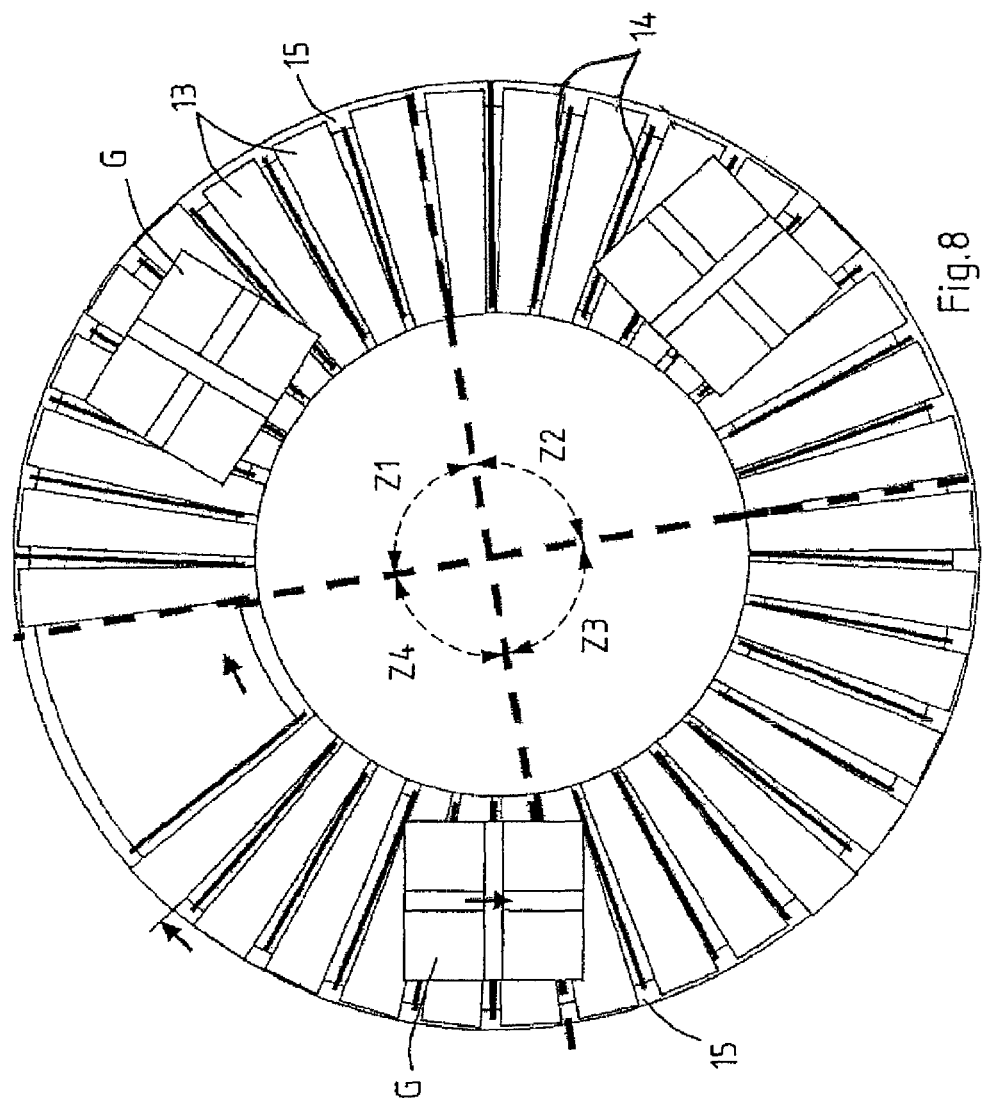
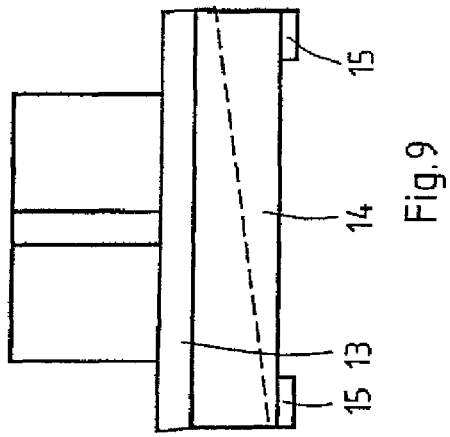 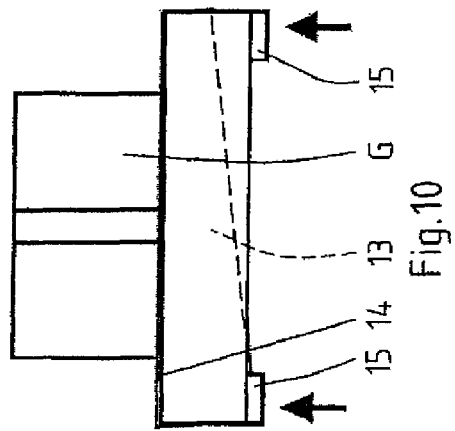

CONVEYOR FOR CONVEYING AND BUFFERING ARTICLES

CROSS-REFERENCE TO RELATED APPLICATION

The present application is a national stage filing of International patent application Serial No. PCT/NL2007/050485, filed Oct. 5, 2007, and published as WO 2008/044926 in English.

BACKGROUND

A conveyor for conveying and buffering articles and the like along a vertically extending, substantially helical path is known, for example from U.S. Pat. No. 6,935,485. The conveying means of said known conveyor consist of a roller track with so-called "powered rollers", which rollers are provided with an internal motor, which can be turned on and off via switch devices. Thus, articles can be buffered in the zones by stopping the drive motors and be transported further again by activating the drive motors. Although such a system functions satisfactorily, the "powered rollers" are comparatively costly and require a high level of maintenance.

SUMMARY

This Summary and Abstract are provided to introduce some concepts in a simplified form that are further described below in the Detailed Description. This Summary and Abstract are not intended to identify key features or essential features of the claimed subject matter, nor are they intended to be used as an aid in determining the scope of the claimed subject matter. In addition, the description herein provided and the claimed subject matter should not be interpreted as being directed to addressing any of the short-comings discussed in the Background.

One aspect is a conveyor for conveying and buffering articles and the like along a vertically extending, substantially helical path. The conveyor includes a frame and a conveying assembly supported by the frame. The conveying assembly extends along said helical path and is capable of conveying the articles along said path, which substantially helical path is at least partially divided into zones, each zone being provided with switch members, in such a manner that the conveyor can be switched in each zone between a conveying position, in which the conveying assembly conveys the articles, and a buffering position, in which the articles present in said zone are stationary. The conveyor further includes buffering devices distributed over the length of the conveying assembly and being present in each zone, which function to support the articles in the buffering position. The conveying assembly and the buffering devices are vertically movable with respect to each other in each zone, in such a manner that the articles in question will be supported by the conveying assembly in the conveying position and by the buffering devices in the buffering position in said zone.

By using separate conveying assembly and buffering devices, they can be specifically selected for their respective purposes and the conveying assembly can be driven continuously, which has a positive effect both as regards reliability and as regards wear.

The buffering devices can be vertically adjustable with respect to the frame in the conveying assembly, as in most cases this is the easiest way to realise this.

In a special embodiment, the buffering devices are disposed on either side of the conveying element. In such an embodiment, the width of the conveying assembly in relation to that of the articles to be conveyed must be so small that the articles project from the conveying assembly and that the projecting parts thereof can be supported by the buffering devices. This functions best with articles which are relatively stiff, of course, in particular the bottom surface thereof, and which preferably have a regular shape, most preferably having the same dimensions. Articles that can certainly be considered with such an embodiment are crates, cases, boxes and the like.

It is advantageous in that connection if the buffering devices are configured as rail sections that extend along part of the helical path. Such buffering devices can support the articles in a reliable manner and deliver them to the conveying assembly again. The rail sections may extend over the entire zone or only over a part thereof, whilst each zone may furthermore comprise several rail sections.

In one embodiment the conveying assembly is configured as an endless conveyor belt, for example a slat conveyor belt. Such conveying assembly can be of comparatively low-cost construction and contribute to a smooth transportation of the articles at a low noise level.

In this embodiment it is advantageous if the conveyor belt comprises a support surface having a convex cross-section.

In such an embodiment the articles to be conveyed will be supported in a stable manner on the conveyor belt because the articles are supported along a curved line of contact in the centre thereof. When the conveyor belt has a flat upper side, the articles will be supported on two corners with their flat bottom side because of the helical shape, as a result of which the articles may start to wobble. The articles will not exhibit such a tendency when a convex support surface is used.

An alternative embodiment of the conveyor is characterised in that the conveying assembly comprises a number of driveable rollers evenly distributed along the length of the substantially helical path for forming a roller track extending along the substantially helical path. Such a conveyor can be of relatively low-cost construction, since the rollers can be driven in a simple manner, possibly continuously. The buffering devices may be disposed on either side of the roller conveyor, as is the case with the conveyor belt, but they may also be disposed between the rollers, for example in the form of fingers or cross ribs. In this way the conveyor is suitable for use with several kinds of articles of varying shape.

Another aspect is a conveyor for conveying and buffering articles and the like along a vertically extending, substantially helical path. The conveyor includes a frame and conveying assembly supported by the frame that extends along said helical path and which is capable of conveying the articles along said path being driven by a drive. The substantially helical path is at least partially divided into zones. Each zone is provided with switch members, in such a manner that the conveyor can be switched in each zone between a conveying position, in which the conveying assembly conveys the articles, and a buffering position, in which the articles present in said zone are stationary. Buffering devices are distributed over the length of the conveying assembly and being present in each zone. The buffering devices function to support the articles in the buffering position. The drive and the buffering devices are vertically movable with respect to each other in each zone, in such a manner that the articles in question are in contact with the drive in the conveying position and with the buffering devices in the buffering position in said zone.

Yet another aspect is a conveyor for conveying and buffering articles and the like along a vertically extending, substantially helical path. The conveyor includes a frame and conveying assembly supported by the frame, which extends along said helical path and which is capable of conveying the articles along said path via their support surface. The substantially helical path is at least partially divided into zones. Each zone is provided with switch members, in such a manner that the conveyor can be switched in each zone between a conveying position, in which the conveying assembly conveys the articles, and a buffering position, in which the articles present in said zone are stationary. Buffering devices are distributed over the length of the conveying assembly and which function to support the articles in the buffering position. The buffering devices and said support surface are vertically movable with respect to each other in each zone, in such a manner that the articles are in contact with a drive in the conveying position and that the contact between the drive and the articles is broken in the buffering position, wherein the buffering devices will support the articles in question in said zone.

BRIEF DESCRIPTION OF THE DRAWINGS

Aspects of the invention will be explained in more detail hereinafter with reference to the drawings, which are very schematic views of embodiments of the conveyor.

FIG. 2 is a sectional view along the line II-II in FIG. 1.

FIGS. 3 and 4 are simplified sectional views along the lines III-III and IV-IV, respectively, in FIG. 2, which illustrate the buffering function of the conveyor of FIGS. 1 and 2.

FIGS. 5, 6 and 7 are sectional views corresponding to FIGS. 2-4 of a second embodiment of the conveyor.

FIGS. 8, 9 and 10 are sectional views corresponding to FIGS. 2-4 of a third embodiment of the conveyor.

DETAILED DESCRIPTION OF THE ILLUSTRATIVE EMBODIMENTS

Figure 1:
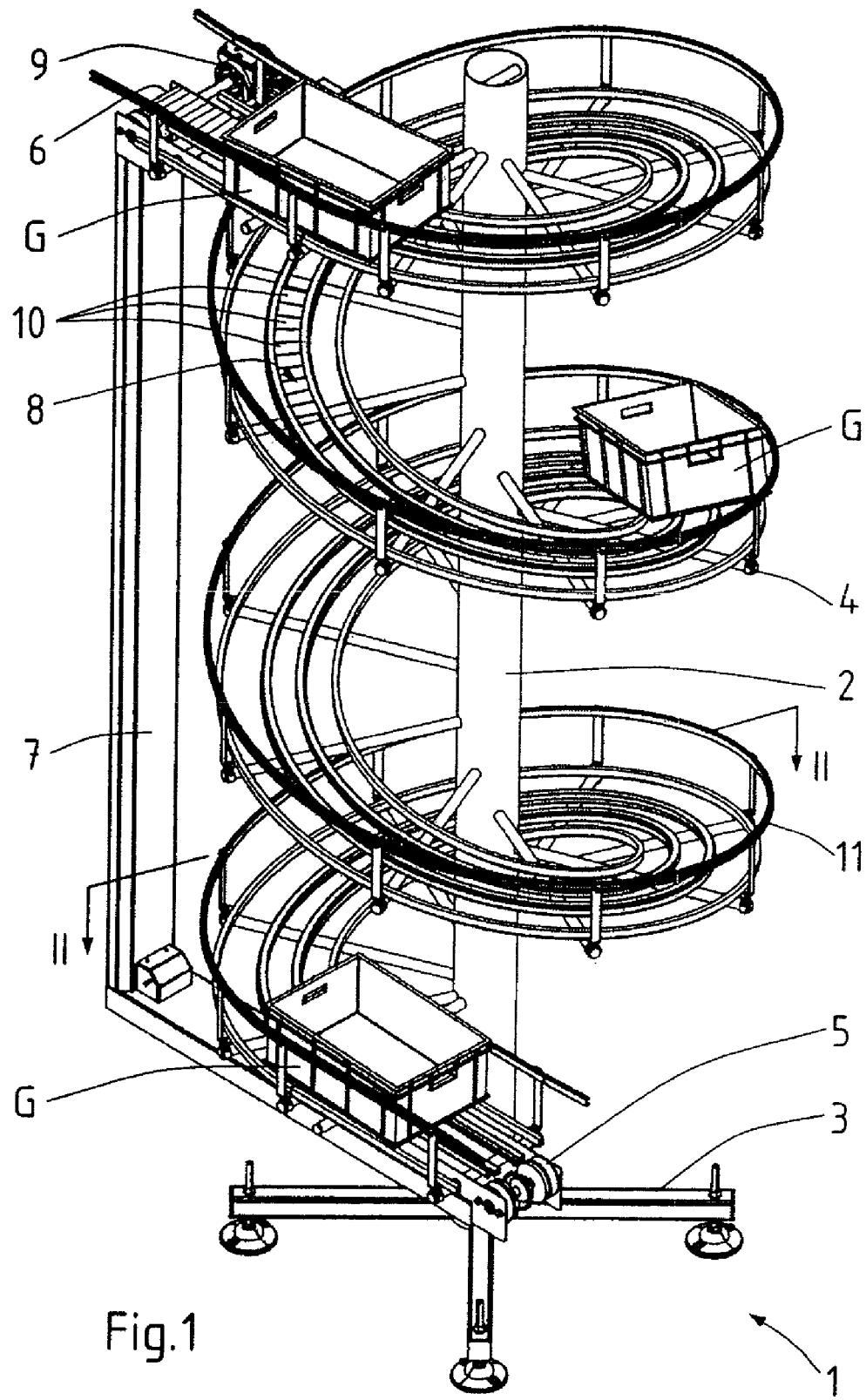
FIG. 1 is a schematic, perspective view of a first embodiment of the conveyor.
Figure 11:
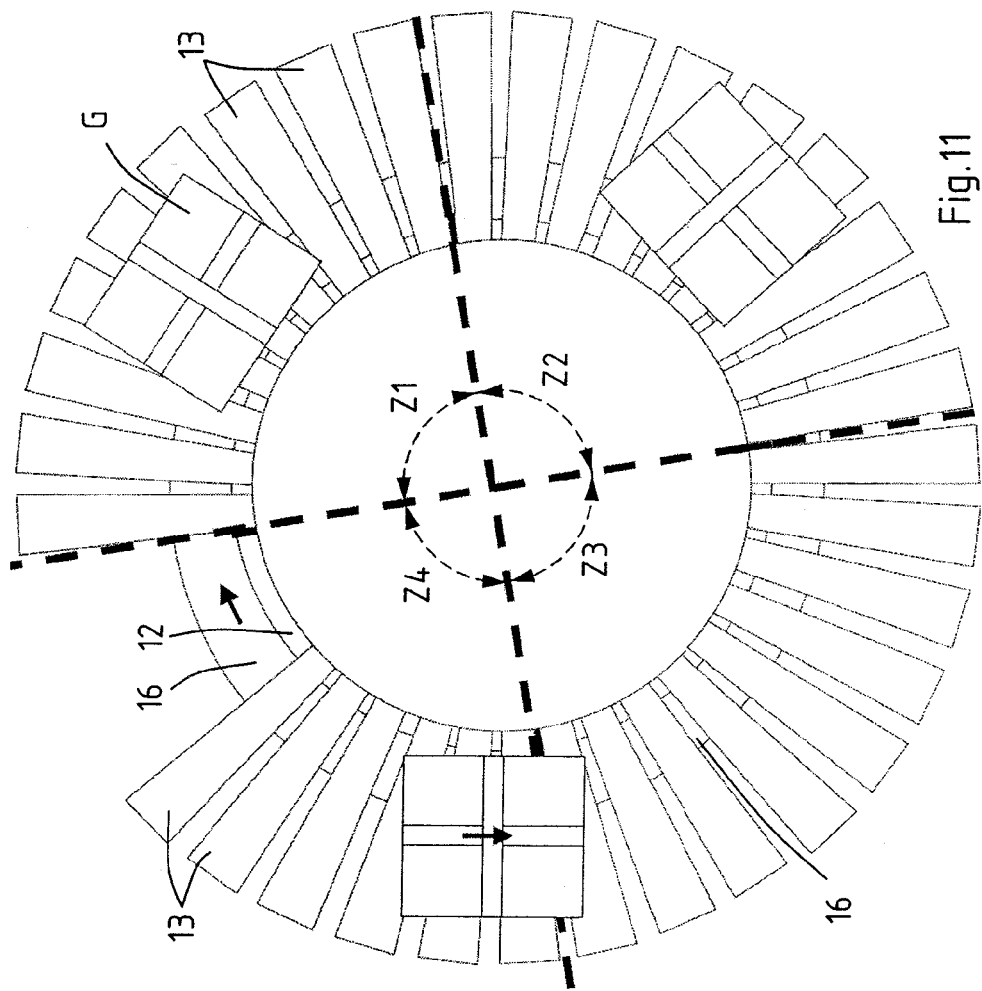
FIGS. 11-13 are sectional views corresponding to FIGS. 2-4 of a fourth embodiment of the conveyor.
Figure 12:
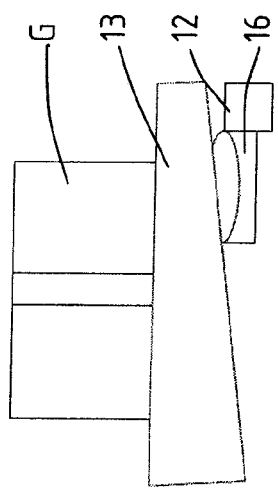
Figure 13:
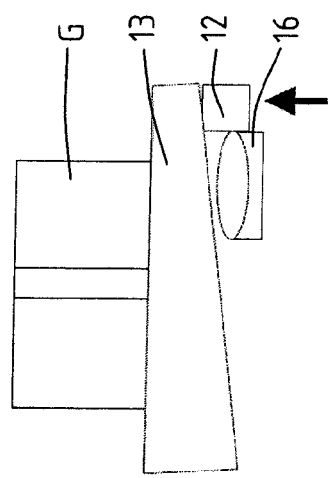
Figure 14:
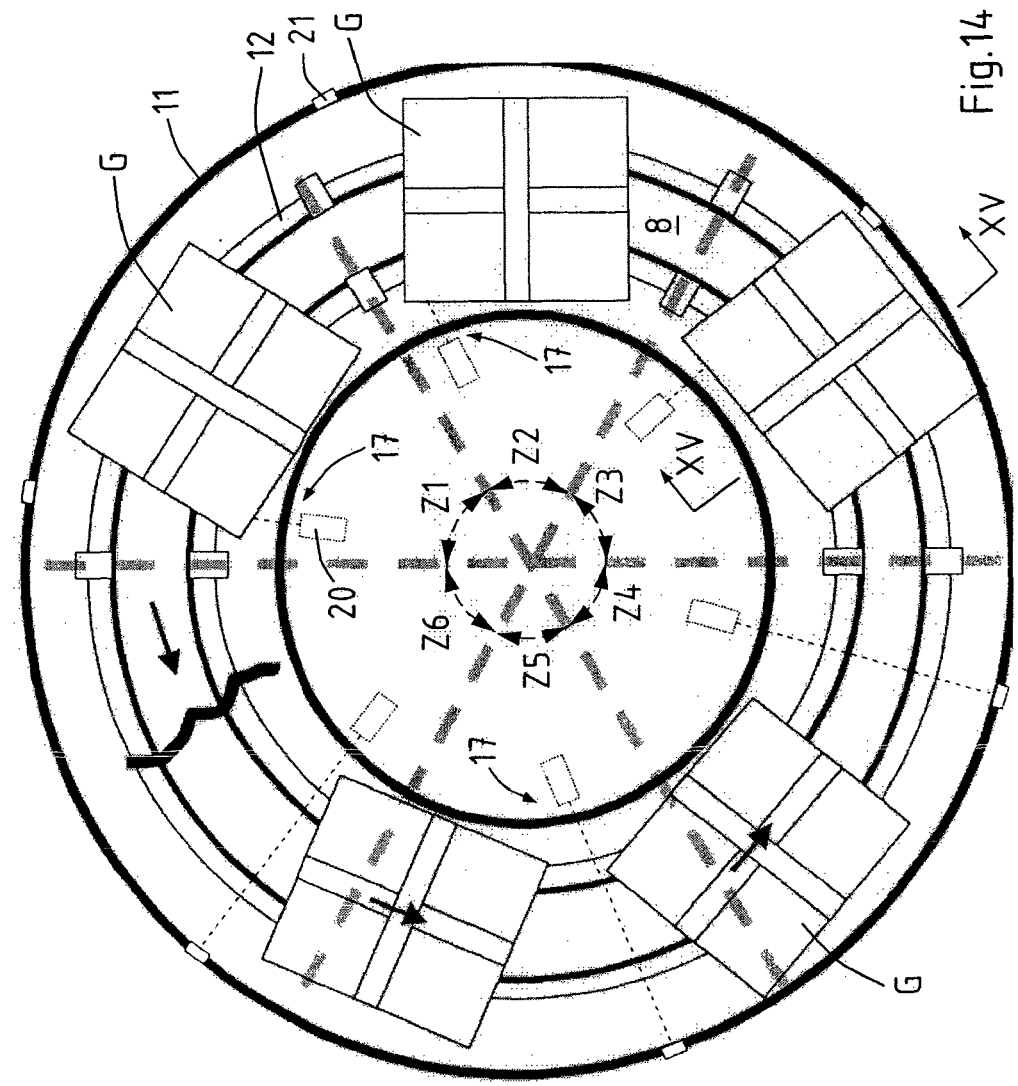
FIG. 14 is a sectional view corresponding to FIG. 2 of the first embodiment of the conveyor, in which the sensor arrangement is illustrated.
Figure 15:
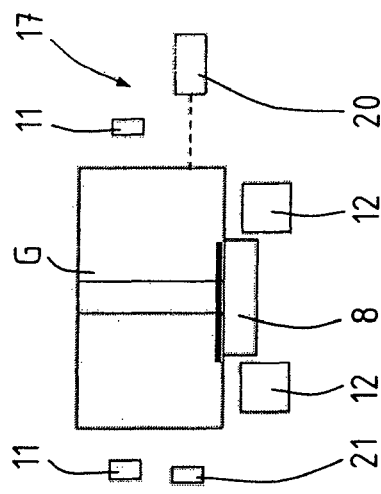
FIG. 15 is a sectional view along the line XV-XV in FIG. 14.
Figure 16:
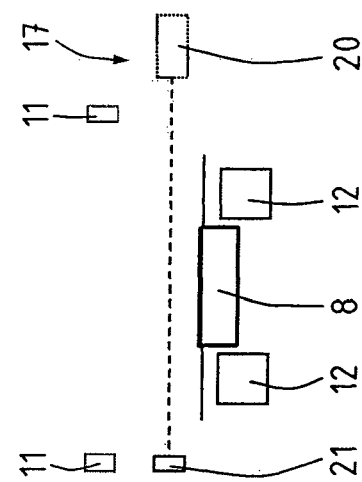
FIG. 16 is a sectional view corresponding to FIG. 15, in which no articles are present in the zone in question, however.
Figure 17:
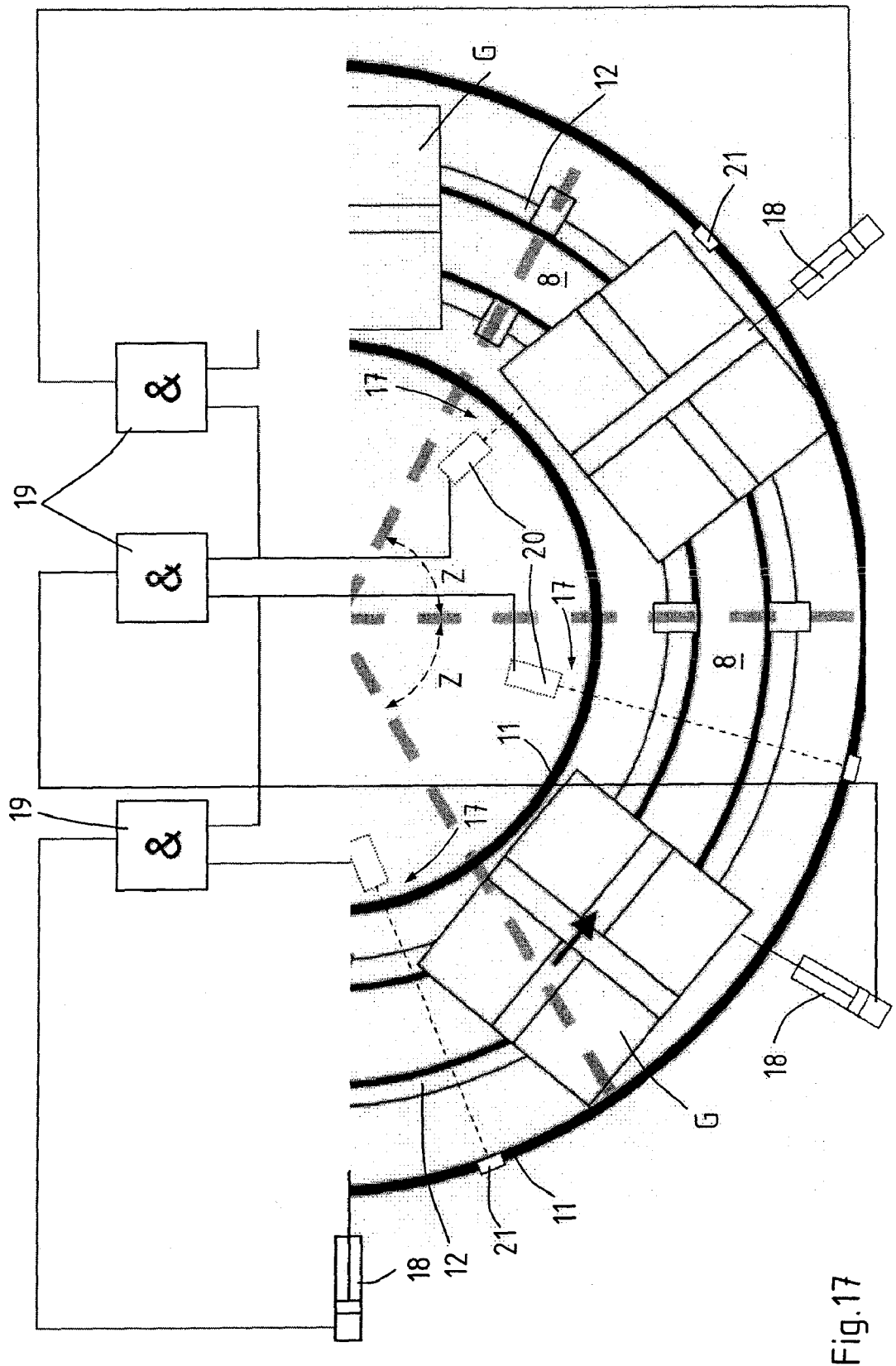
FIG. 17 a part of the sectional view of FIG. 14, illustrating the manner in which switch members are controlled in the zones.

The drawing shows a conveyor which is capable of conveying products, in particular articles G, in vertical direction along a helical path. In practice such conveyors are also known as spiral conveyors or winding conveyors. Said conveyors are suitable for conveying products in a continuous flow, which product flow may be intended for vertical transport, but in particular for buffering products in a process line. Possible applications are, for example, the foodstuffs industry, distribution centers, the graphics industry and the like. Articles which are very suitable for being conveyed by means of such conveyors are, for example, boxes, crates, cases and other articles exhibiting a reasonable degree of shape-stability, in particular the bottom surface thereof, and which cannot fall over.

The illustrated conveyor comprises a frame 1, in this case having a central column 2 with bases 3 and a helical guide chute 4, which extends around the column 2 and which is attached thereto. All kinds of other frame constructions are conceivable, of course. An end pulley 5, 6 is mounted to the upper end and the lower end, respectively, of the guide chute 4, and a return chute 7 of the frame 1 extends between said ends of the helical guide chute 4. In this embodiment a conveying assembly includes a conveyor belt 8 supported by the frame 1 that travels along different paths in the conveying portion and the return portion, therefore. It is also conceivable, however, to use embodiments in which the conveying belt is returned along the underside of the guide chute 4.

In the illustrated embodiment the helical guide chute 4 comprises three windings, but this number may be increased or decreased, depending on the application in question. The conveyor belt 8 can be driven through a large number of windings without any problem. In the illustrated embodiment, a drive motor 9 engages the end pulley 6 at the upper end of the conveyor track. If desired, auxiliary drive units may be used at different locations along the conveyor track. The conveyor belt 8 may also be driven linearly. The conveyor may be connected to further conveyors at the lower and upper end pulleys 5, 6.

The illustrated conveyor belt 8 comprises a large number of slats 10, which are interconnected either directly or via an endless connecting element. Each slat 10 has an upper, flat support surface, and the slats abut each other so closely in their conveying path that products can be supported by a number of adjacent slats 10. As already said before, the slats 10 are pivotally interconnected either directly, or in this embodiment, via an endless connecting element, such as a side-bow chain, in such a manner that the slats 10 can pivot relative to each other, both about a first axis parallel to their conveying surface and perpendicular to the conveying direction, and about the second axis perpendicular to the conveying surface and perpendicular to the conveying direction.

Said latter pivoting motion enables transport in a helical path, whilst the former pivoting motion enables the conveyor belt 8 to pass over the end pulleys 5 and 6.

Since the slats 10 taper off slightly from their central axis towards the ends, the slats 10 do not obstruct each other in bends. Other shapes, such as a diamond shape, a V-shape, a toothed shape and also overlaps or a combination thereof are possible. In a special embodiment the slats 10 may be segmented, in which case the conveyor belt 8 can only travel along a fully curved path, however, but on the other hand a fully closed surface of the conveyor belt 8 is effected in that case.

Other belt conveyors, such as conveyors comprising links and the like, are conceivable. Examples of belt conveyors that may be used are disclosed in more detail in WO 99/11547 and WO 03/024846, the content of which is incorporated herein by reference. The frame of said belt conveyors is provided with a helical frame, and the endless conveyor belt is guided in at least substantially radial direction with respect to the guide by means of guide rollers.

FIG. 1 furthermore shows that the guide chute of the frame is provided with a railing 11 at least on the outer side, but preferably on both sides (see FIGS. 3 and 4), which railing prevents articles falling off the conveyor on the outer side of the helical path and which furthermore provides an at least substantially symmetric support for the articles relative to the conveyor belt.

In order to perform a buffering function, the helical conveying path of the conveyor is divided into zones Z (see FIG. 2), which are each provided with switch members, in such a manner that in each zone the conveyor can be switched between a conveying position, in which the conveyor belt conveys the articles, and a buffering position, in which the articles present in the zone in question are stationary. A zone may extend through an arc angle of 30, 60 or 90 degrees, for example, but any other arc angle is conceivable, depending on the application in question. In the embodiment of FIG. 2 each zone $Z_1$-$Z_6$ extends through an arc angle of 60 degrees.

FIGS. 1-5 show that buffering devices in the form of rail sections 12 are disposed on either side of the conveyor belt so as to provide the buffering function. Said rail sections 12 extend through an arc angle that corresponds to the arc angle of a zone Z, and in fact said rails sections 12 determine the zones ($Z_1$-$Z_6$). The rail sections 12 of each zone can be moved up and down with the aid of the switch members. In the lower position of the rail sections 12, said rail sections 12 are positioned below the level of the upper surface of the conveyor belt 8 (FIG. 3), as a result of which the article G is moved ahead by the conveyor belt 8. The width of the conveyor belt 8 is so small in comparison with the articles G to be conveyed that said articles project laterally from the conveyor belt 8. When the rail sections 12 are moved upwards to their buffering position, they will extend above the upper surface of the conveyor belt 8 (FIG. 4), and an article present in the zone in question will come to be supported on the rail sections 12 with the parts that project laterally from the conveyor belt 8, thus enabling the conveyor belt 8 to move under the lifted article. When the rail sections 12 move down, the article in question will be lowered onto the conveyor belt 8 again and be conveyed further. In FIG. 2 the articles G are being buffered in zones $Z_1$-$Z_3$, whilst the articles are still being conveyed in zones $Z_4$—$Z_6$.

In order to have the articles stop quickly upon being lifted off the moving conveyor belt 8, the upper surface of the rail sections 12 on which the articles will be supported is provided with an antiskid coating or the like. The articles cannot slide down under the influence of the slope of the rail sections 12 in that case.

As FIGS. 14-17 show, a PLC control unit may be provided for controlling switch members in the zones Z of the conveying path, which control unit is connected to a number of sensors 17, with at least one sensor 17 being present in each of the zones Z. Said sensor 17 may be combined with a controllable air valve for actuating a pneumatic cylinder 18 (FIG. 17) for raising or lowering the rail sections 12. The sensor 17 may furthermore be provided with logic elements 19 to enable communication between the successive sensors 17. To that end the sensors 17 will generally be connected in series, so that, if buffering is taking place in a zone Z, a sensor 17 in a next zone can be informed that buffering must take place in said next zone as well upon detection of the presence of a article by said sensor 17. Conversely, when an article leaves a zone Z, the sensors 17 in all the next zones must be informed that buffering is not necessary upon passage of an article. A sensor unit 17 that might be used is for example a photoelectric cell 20 with a reflector 21, as for example the reflection (infrared) light sensor for roller conveyors type WTR1 from SICK. Other sensors-detectors, such as probes, approach switches and the like are conceivable.

Obviously, other possibilities are available for controlling the switch members. Thus it is for example possible to count articles at the start and at the end of the conveyor and activate and deactivate zones on the basis thereof. Furthermore a system is conceivable in which buffering takes place directly at the start of the conveyor by moving up or indexing one zone each time and releasing a product at the delivery end of the conveyor. Furthermore it is possible to have random buffer zones occupied, and in some processes it is even conceivable not to operate according to the first-in-first-out (FIFO) principle but according to the first-in-last-out principle, in which case a reversal of the conveying direction may be effected.

FIGS. 5-7 show a second embodiment of the conveyor according to the invention, in which the conveying assembly does not consist of a conveyor belt or the like but of a roller track. Said roller track includes a plurality of rollers distributed over the length of the helical path, in this case conical rollers 13, which jointly form a helical conveying surface. In principle the rollers are driven continuously, in which case all rollers will in principle be driven, but in principle it is also possible to drive fewer rollers and to configure some rollers as freely rotatable rollers, as long as it can be effected that the articles G can be conveyed in all positions. The rollers 13 may be provided with internal drive units, so-called motorised rollers or "powered rollers", but it is also conceivable to position a driving conveyor belt under the rollers, which conveyor belt is in engagement with all the rollers and thus drives said rollers. The rollers 13 may be interconnected, so that the drive unit engages one roller 13, which in turn drives one or more other rollers 13 via the connections.

In this embodiment the buffering devices are comparable to those used in the first embodiment, viz. consisting of arcuate rail sections 12, the arc angle substantially corresponds to that of the associated zone Z. Accordingly, the operation of the device is the same as that of the first embodiment.

FIGS. 8-10 show a third embodiment, in which the conveying assembly again consists of driveable rollers 13. In this case wider rollers 13 are used, however, so that said rollers can support the articles G to be transported and buffered over the entire width thereof. In order to be able to release the articles G from the conveying assembly in this case as well for the purpose of buffering the same, the buffering devices are disposed between the rollers 13 in this embodiment and are configured as fingers or cross ribs 14, which can be individually controlled for each zone Z in this embodiment as well. In the illustrated embodiment, each zone Z extends through an angle of 90°. The cross ribs 14 of each zone are interconnected by arcuate members 15, so that the cross ribs 14 can be adjusted for height by a single drive unit in each zone Z.

The operation is again comparable to that of the preceding embodiment, with this difference that the articles G are now supported over their entire width at a number of spaced-apart locations in their buffered position.

FIGS. 11-14 show a fourth variant of an embodiment of the conveyor according to the invention. In this variant, rollers 13 are used as the conveying assembly again. Said rollers 13 can be driven by a drive, in this embodiment in the form of a driving belt 16 disposed under the rollers 13. The buffering devices are again configured as rail sections 12, which are vertically adjustable under the control of the switch members with respect to the drive and with respect to the support surface of the rollers 13 that function as the conveying assembly. The vertical adjustment of the buffering devices makes it possible to lift the rollers 13, which are in contact with the driving belt 16 in the conveying position, and the articles G from the driving belt 16 and thus release the driving engagement. The rollers 13 and thus the articles G are supported by the buffering devices 12 in the buffering position. The rail sections of the buffering devices or separate brakes that may be provided effect a rapid deceleration of the rotation of the rollers 13, so that the articles will quickly come to a standstill. When the buffering devices are lowered, the rollers are brought into contact with the drive again and will transport the article in question further again. Of course it would also be possible to adjust the drive for height and thus either drive the rollers or lower the rollers onto the buffering devices. In both cases a vertical adjustment between the support surface of the conveying assembly and the buffering devices will take place, which is also the case in the other embodiments.

The rollers may also be differently configured, for example as straight cylindrical rollers or as a plurality of wheels (roller skater wheels) evenly distributed over a shaft or an axis. In the embodiments comprising rollers it is not necessary to drive the rollers by means of a motor in a situation in which products are only transported in downward direction. In that case the articles are driven by the force of gravity in combination with the freely rotating rollers.

The invention is not limited to the embodiments as described above and illustrated in the drawings, which can be varied in various ways within the scope of the invention as defined in the claims. Thus it is possible to exchange the rail sections and the conveyor belts for one another, so that single rail sections are provided between conveyor belts extending on either side thereof. When rail sections or other buffering devices are provided on either side of the conveyor belt, it is furthermore possible to move only the buffering devices disposed on one side of the conveyor belt, so that the articles are supported at a slight angle above the conveyor belt or other conveying assembly. Furthermore it is possible to make the conveyor belts or other conveying assembly vertically adjustable rather than the buffering devices. Instead of using rail sections as the buffering devices, other supports may be used, such as a plurality of fingers or differently configured lifting devices distributed over the zone.

If a roller track is used, all kinds of driving arrangements may be used for the rollers, such as one or more or drive units connected to one or more rollers, whilst the rollers are interconnected. Also motorised rollers might be used.

The conveyor track will preferably be spiral-shaped, but it may also have an at least partially different shape, if this is more advantageous for the application in question. It is also possible to couple spirals, so that the articles move up in one spiral and move down again in the other spiral. The articles will land at the same level again or at a different level in that case. The spiral shape makes it possible to realise a large buffering capacity on a small surface area.

In the case of three-dimensionally curved conveyor tracks it is advantageous to configure a supporting conveyor belt or a driving conveyor belt with a support surface/driving surface having a convex cross-section, because this makes it possible to realise a better and more stable engagement of the articles or the rollers.

In the illustrated embodiments the vertical adjustment of the buffering devices and the conveying assembly takes place by pneumatic devices, but it is also possible to use electric devices for this purpose. It is also conceivable, however, to have said raising and lowering take place mechanically via the conveying assembly, in which case a temporary connection with the conveying assembly effects the movement in vertical direction, for example via an eccentric or the like.

The invention claimed is:

1. A conveyor for conveying and buffering articles along a vertically extending, winding path, the conveyor comprising:
   a frame,
   a conveying assembly supported by the frame, which extends along said winding path and is configured for conveying the articles along said path, wherein the path is at least partially divided into zones, each zone being provided with a switch member so that conveyance of the articles is selectively switched in each zone between a conveying position, in which the conveying assembly conveys the articles, and a buffering position, in which the articles present in said zone are stationary, and
   a plurality of buffering devices distributed over the path with a buffering device present in each zone and configured to support the articles in the buffering position, wherein said conveying assembly and said buffering devices are configured to allow vertical movement with respect to each other in each zone so that the articles are supported and conveyed by the conveying assembly in the conveying position and are held stationary by the buffering devices in the buffering position.

2. The conveyor according to claim 1, wherein the buffering devices are vertically adjustable with respect to the frame in the conveying assembly.

3. The conveyor according to claim 1, wherein the buffering devices are disposed on either side of a conveying element of the conveying assembly.

4. The conveyor according to claim 1, wherein the buffering devices are configured as rail sections that extend along part of the winding path.

5. The conveyor according to claim 1, wherein the conveying assembly is configured as an endless conveyor belt.

6. The conveyor according to claim 5, wherein the conveyor belt comprises a support surface having a convex cross-section.

7. The conveyor according to claim 5, wherein the frame is provided with a guide and wherein rollers guide the endless conveyor belt in at least a substantially radial direction with respect to said guide.

8. The conveyor according to claim 1, wherein the conveying assembly comprise a number of driveable rollers evenly distributed along the length of the winding path for forming a roller track extending along the winding path.

9. The conveyor according to claim 8, wherein the buffering devices are disposed between the rollers.

10. The conveyor according to claim 9, wherein the buffering devices are configured as fingers.

11. The conveyor according to claim 1, wherein the buffering devices are provided with antiskid surfaces that support the articles.

12. The conveyor according to claim 1, wherein a sensor device is provided in each zone, which sensor device cooperates with said switch members, and wherein the switch members of the various zones are connected in series.

13. The conveyor according to claim 1, wherein the buffering devices and the conveying assembly can be moved in vertical direction with respect to each other by pneumatically or electrically operated lifting devices.

14. The conveyor according to claim 1, wherein the buffering devices and the conveying assembly can be moved in vertical direction with respect to each other by lifting devices which can be mechanically operated by the moving conveying assembly.

15. A conveyor for conveying and buffering articles along a vertically extending, winding path, the conveyor comprising:
   a frame,
   a conveying assembly supported by the frame and driven by a drive, which extends along said winding path and is configured for conveying the articles along said path, wherein the path is at least partially divided into zones, each zone being provided with a switch member so that conveyance of the articles is selectively switched in each zone between a conveying position, in which the conveying assembly conveys the articles, and a buffering position, in which the articles present in said zone are stationary, and
   a plurality of buffering devices distributed over the path with a buffering device present in each zone and configured to support the articles in the buffering position, wherein said drive and said buffering devices are configured to allow vertical movement with respect to each other in each zone so that the articles are in contact with the drive in the conveying position and with the buffering devices in the buffering position.

16. A conveyor for conveying and buffering articles along a vertically extending path, the conveyor comprising:
  a frame,
  a conveying assembly supported by the frame, which extends along said path and is configured for conveying the articles along said path via a support surface, wherein the path is at least partially divided into zones, each zone being provided with a switch member so that the conveyor is selectively switched in each zone between a conveying position, in which the conveying assembly conveys the articles, and a buffering position, in which the articles present in said zone are stationary, and
  a plurality of buffering devices distributed over the path present in each zone and configured to support the articles in the buffering position, wherein said buffering devices and said support surface are configured to allow vertical movement with respect to each other in each zone so that the articles are in contact with the support surface in the conveying position and so that the contact between the support surface and the articles is broken in the buffering position and the buffering devices are configured to support the articles.

17. The conveyor according to claim 1, wherein the conveying assembly is configured to support and convey a bottom surface of at least one of the articles in the conveying position.

18. The conveyor according to claim 1, wherein each of the buffering devices is configured to hold stationary a bottom surface of at least one of the articles in the buffering position.

19. The conveyor according to claim 15, wherein said drive and each of said buffering devices are configured so that a bottom surface of at least one of the articles is in contact with the drive in the conveying position and with a buffering device in the buffering position.

20. The conveyor according to claim 16, wherein said support surface and each of said buffering devices are configured so that a bottom surface of at least one of the articles is in contact with the support surface in the conveying position and with a buffering device in the buffering position.

* * * * *